(12) United States Patent
Takahashi

(10) Patent No.: US 9,201,196 B2
(45) Date of Patent: Dec. 1, 2015

(54) HIGH-ORDER MODE FILTER

(71) Applicant: Shigeki Takahashi, Tokyo (JP)

(72) Inventor: Shigeki Takahashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/360,107

(22) PCT Filed: Nov. 29, 2012

(86) PCT No.: PCT/JP2012/080967
§ 371 (c)(1),
(2) Date: May 22, 2014

(87) PCT Pub. No.: WO2013/081063
PCT Pub. Date: Jun. 6, 2013

(65) Prior Publication Data
US 2014/0286606 A1 Sep. 25, 2014

(30) Foreign Application Priority Data

Nov. 30, 2011 (JP) ................. 2011-262289

(51) Int. Cl.
*G02B 6/10* (2006.01)
*G02B 6/122* (2006.01)
*G02B 6/14* (2006.01)
*G02B 6/26* (2006.01)
*G02B 6/12* (2006.01)

(52) U.S. Cl.
CPC ........... *G02B 6/122* (2013.01); *G02B 6/14* (2013.01); *G02B 6/268* (2013.01); *G02B 2006/12097* (2013.01); *G02B 2006/12109* (2013.01)

(58) Field of Classification Search
CPC .......... G02B 6/122; G02B 6/14; G02B 6/268; G02B 2006/12109
See application file for complete search history.

(56) References Cited

U.S. PATENT DOCUMENTS

| 2004/0017991 A1* | 1/2004 | Brady ........................ 385/130 |
| 2011/0217002 A1* | 9/2011 | Mekis et al. ................. 385/28 |

FOREIGN PATENT DOCUMENTS

| JP | H08-327839 A | 12/1996 |
| JP | 2001-133647 A | 5/2001 |
| JP | 3356436 B2 | 12/2002 |
| JP | 2004-511820 A | 4/2004 |
| JP | 2006-173573 A | 6/2006 |
| JP | 2010-281899 A | 12/2010 |
| JP | 2011-75917 A | 4/2011 |

OTHER PUBLICATIONS

International Search Report for PCT Application No. PCT/JP2012/080967, mailed on Jan. 29, 2013.

* cited by examiner

*Primary Examiner* — Ryan Lepisto

(57) ABSTRACT

A high-order mode filter includes a slab region, a band-shaped projection elongated in an optical waveguide direction, a first optical waveguide including a disturbance element and a second optical waveguide. The disturbance element is formed by doping impurities into the slab region, thus indicating a lower refractive index than the slab region. Both the first optical waveguide and the second optical waveguide are alternately arranged. The first optical waveguide may include a disturbance element positioned close to the projection, while the second optical waveguide may include a disturbance element distanced from the projection in the slab region. The high-order mode filter causes a large high-order mode loss due to interference between a removable high-order mode and an intentional high-order mode at the connecting face between the first optical waveguide and the second optical waveguide, thus reducing reflected light and stray light.

8 Claims, 12 Drawing Sheets (a)

(b)

(c)

(a)

(b)

(a)

(b)

(c)

(a)

(b)

(c)

HIGH-ORDER MODE FILTER

This application is a National Stage Entry of PCT/JP2012/080967 filed on Nov. 29, 2012, which claims priority from Japanese Application 2011-262289 filed on Nov. 30, 2011, the contents of all of which are incorporated herein by reference, in their entirety.

TECHNICAL FIELD

The present invention relates to a high-order mode filter which reduces higher modes and leaking modes in optical waveguides.

The present application claims priority on Japanese Patent Application No. 2011-262289 filed Nov. 30, 2011, the entire content of which is incorporated herein by reference.

BACKGROUND ART

It is known that high-order mode filters can reduce higher modes to prevent optical elements having optical waveguides from being degraded in performance due to inclusion of higher modes and leaking modes (hereinafter, referred to as "higher modes"). Conventionally, it is known that taper-structured waveguides can remove higher modes by use of very thin single-mode waveguides. However, taper-structured waveguides cause higher modes due to tapered structures by themselves. It is difficult to produce taper-structured waveguides using extremely thin widths of waveguides because wherein they suffer from a drawback in that the lengths of elements are increased to be relatively longer because a basic-mode loss increases due to processing roughness on side faces of waveguides.

Patent Literature Document 1 discloses a waveguide-type high-order mode filter which can solve the problem of a taper-structured waveguide. Such a high-order mode filter applies diffraction grating on side walls so as to effectively scatter higher modes while achieving a small basic-mode loss. Patent Literature Document 1 discloses an example of a calculation regarding a high-order mode filter with a basic-mode loss of 1 dB and a high-order mode loss of 10 dB. The high-order mode filter is not applicable to high-accuracy optical communication technologies, which require small losses in optical waveguides.

To solve the above problem, it is possible to provide a high-order mode filter with any means that can efficiently and solely remove higher modes in laser elements. For example, Patent Literature Document 2 discloses a laser element in which a light-wave reducing loss element is disposed at a predetermined position in an optical waveguide. A light-wave reducing loss element is disposed at the position at which a higher mode is influenced under coherent superposition of a basic mode and a higher mode, thus efficiently removing a higher mode.

Patent Literature Document 3 discloses an optical filter which can remove a higher mode in an optical waveguide. The optical filter is a high-order mode filter with a small basic-mode loss, which will be described with reference to FIG. 12(a), (b). A high-order mode filter 100 is configured by alternately connecting a first waveguide 104 with a small terrace width and a second waveguide 105 with a large terrace width in a multi-mode rib waveguide in which a projection 101 is disposed on a terrace 102, thus efficiently removing a higher mode alone. Compared with a basic mode, a higher mode may cause a large expansion of an electric field over the terrace 102, thus causing a high loss at a connecting face 111 between the first waveguide 104 and the second waveguide 105. In contrast, a basic mode may cause a small expansion of an electric field over the terrace 102, and therefore it is possible to reduce any loss at the connecting face 111.

CITATION LIST

Patent Literature Document

Patent Literature Document 1: Japanese Patent Application Publication No. 2001-133647
Patent Literature Document 2: Japanese Patent No. 3356436
Patent Literature Document 3: Japanese Patent Application Publication No. 2010-281899

SUMMARY OF INVENTION

Technical Problem

In the high-order mode filter of Patent Literature Document 2 which can suppress a basic-mode loss, it is necessary to fix the phase relationship between a basic mode and a higher mode in order to specify the position of disposing a light-wave reducing loss element. The high-order mode filter of Patent Literature Document 2 aims to generate a high output by suppressing a kink in a laser element, wherein a kink occurs due to the phase-locked superposition of a basic mode and a higher mode, and therefore the phase relationship between a basic mode and a higher mode should be fixed in a laser element.

However, the configuration of Patent Literature Document 2 is not applicable to generally-known optical elements in which the phase relationship between a basic mode and a higher mode is not fixed. Even though the phase relationship between a basic mode and a higher mode can be fixed, it is inevitable that an area receiving a high-order mode loss is limited because the size of a light-wave reducing loss element in an optical-waveguide direction is roughly equal to a quarter of a basic-mode wavelength in an optical waveguide. For this reason, the configuration of Patent Literature Document 2 provides a low performance in terms of removing a higher mode, and therefore it is necessary to increase an element length in order to sufficiently attenuate a higher mode.

The high-order mode filter of Patent Literature Document 3, which can suppress a basic-mode loss, may need a highly accurate manufacturing process to form the first optical waveguide and the second optical waveguide with different terrace widths. Specifically, when the high-order mode filter of Patent Literature Document 3 is manufactured using etching processes, it is necessary to carry out etching intended for the formation of a terrace irrespective of the formation of a projection. Therefore, it is necessary to carry out both an etching mask forming process and an etching process at least two times; hence, in the second mask forming process, it is necessary to apply a resist mask to a step-difference configuration which is formed in the first etching process.

In the high-order mode filter of Patent Literature Document 3, reflected light may frequently occur at the connecting face between the first optical waveguide and the second optical waveguide, at which the effective refractive index of high-order mode light is greatly varied. Additionally, high-order mode light, which is removed at the connecting face between the first optical waveguide and the second optical waveguide, is emitted outside of the terrace so as to serve as stray light in optical elements. In particular, stray light may have a negative influence on other parts of optical elements integrating a plurality of functional elements. Recently, stray light has been regarded as a significant problem in the active research of optical integrated circuits using silicon semiconductors or compound semiconductors.

The present invention is made to solve the above problem, and it is an object of the invention to provide a low-loss high-order mode filter which can be installed in various optical elements and laser elements, which can reduce the occurrence of reflected light and stray light, and which can be manufactured with ease.

Solution to Problem

The present invention is directed to a high-order mode filter including a planar slab region; a band-shaped projection which is formed on the slab region in an optical waveguide direction; a first optical waveguide including a disturbance element, which is formed at a position distanced from the projection in the slab region, with a lower refractive index than the slab region adjoined in a planar direction; and a second optical waveguide which does not include the disturbance element in proximity to at least the projection. Both the first optical waveguide and the second optical waveguide are alternately arranged at least one or more times. Additionally, the first optical waveguide may include the disturbance element formed at a position proximate to the projection in the slab region, while the second optical waveguide may include the disturbance element formed at a position far from the projection in the slab region. The disturbance element is formed by doping impurities into the slab region.

The phase relationship between the removable high-order mode and the intentional high-order mode which is higher than the removable high-order mode and which has the same symmetry as the removable high-order mode is fixed at the connecting face between the first optical waveguide and the second optical waveguide. The lengths of the first optical waveguide and the second optical waveguide in the optical waveguide direction are defined to cause a large high-order mode loss due to interference between the removable high-order mode and the intentional high-order mode.

Based on a wavelength $\lambda$ of light in a vacuum, an effective refractive index $n_1^{\textit{eff}1}$ of the removable high-order mode of the first optical waveguide, an effective refractive index $n_1^{\textit{eff}2}$ of the intentional high-order mode of the first optical waveguide, an effective refractive index $n_2^{\textit{eff}1}$ of the removable high-order mode of the second optical waveguide, and an effective refractive index $n_2^{\textit{eff}2}$ of the intentional high-order mode of the second optical waveguide, the lengths $L_i$ of the first optical waveguide and the second optical waveguide in the optical waveguide direction are defined in accordance with Equation 1 and Equation 2. In this connection, m is an integer equal to or higher than 1. Assuming the intentional high-order mode as a leaking mode, $n_1^{\textit{eff}2}$, $n_2^{\textit{eff}2}$ denote effective refractive indexes of the two-dimensional slab basic mode which are calculated with respect to the high-order mode filter including the slab region alone while virtually precluding the projection.

$$|L_2^{opt} L_1 + L_1^{opt} L_2 - 2m \cdot L_1^{opt} L_2^{opt}| < L_1^{opt} L_2^{opt} \quad \text{[Equation 1]}$$

$$L_i^{opt} = \frac{\lambda}{2(n_i^{\textit{eff}1} - n_i^{\textit{eff}2})} \quad \text{[Equation 2]}$$

$$L_i \neq \frac{m\lambda}{n_i^{\textit{eff}1} - n_i^{\textit{eff}2}}.$$

Based on a refractive index $n_{core}$ of an optical waveguide core, included in the first optical waveguide and the second optical waveguide, and a mode width W of the removable high-order mode, the lengths $L_i$ of the first optical waveguide and the second optical waveguide in the optical waveguide direction are defined in accordance with Equation 3.

$$L_i^{opt} > \frac{n_{core} W^2}{3\lambda}. \quad \text{[Equation 3]}$$

It is possible to introduce an optical absorption area which is made of an optical absorption material and which is disposed at a farther position than the disturbance element from the projection in the slab region in at least one of the first optical waveguide and the second optical waveguide. Additionally, it is possible to form a tapered structure whose width is varied in a tapered manner in proximity to at least one of the start end and the terminal end of the projection. Herein, at least part of the disturbance element and the optical absorption area is formed using a p-type semiconductor area or an n-type semiconductor area. Moreover, it is possible to form a temperature sensor element in proximity to at least one of the disturbance element and the optical absorption area.

Advantageous Effects of Invention

The high-order mode filter of the present invention demonstrates various effects such that the high-order mode filter can be installed in various optical elements and laser elements, reflected light and stray light can be suppressed, and the high-order mode filter can be manufactured with ease.

DESCRIPTION OF EMBODIMENTS

The present invention will be described in detail by way of examples with reference to the accompanying drawings.

Figure 1:
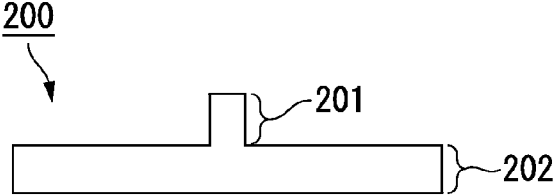
FIG. 1 shows the basic configuration of a high-order mode filter of the present invention, wherein (a) shows a cross-sectional view of an optical waveguide, (b) shows a cross-sectional view of a rib waveguide, (c) shows a cross-sectional view of a ridge waveguide, and (d) shows a cross-sectional view of a high-mesa waveguide.
Figure 1:
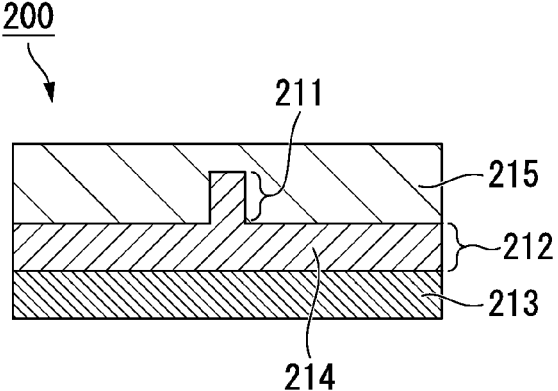
Figure 1:
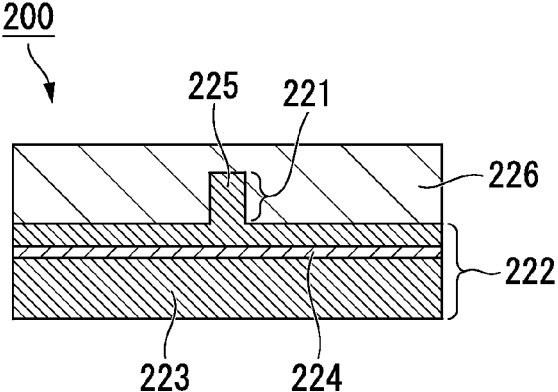
Figure 1:
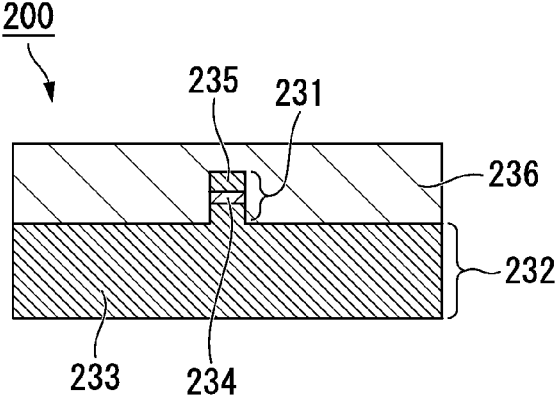

First, an optical waveguide serving as the basic configuration of a high-order mode filter of the present invention will be described. FIG. 1(a) shows a high-order mode filer 200 with a basic configuration including a planar slab region 202 and a band-shaped projection 201 which is formed on the slab region 202 in an optical-waveguide direction. The basic configuration of the high-order mode filter 200 is not limited to that shown in FIG. 1(a); hence, it is possible to employ various configurations. FIG. 1(b) shows a rib waveguide including a slab region 212, a projection 211, a lower clad 213, a core 214, and a cap layer 215. The core 214 has a higher refractive index than the lower clad 213 and the cap layer 215, thus achieving optical confinement in a vertical direction on the surface.

FIG. 1(c) shows a ridge waveguide including a slab region 222, a projection 221, a lower clad 223, a core 224, an upper clad 225, and a cap layer 226. The core 224 has a higher refractive index than the lower clad 223 and the upper clad 225, thus achieving optical confinement in a vertical direction on the surface.

FIG. 1(d) shows high-mesa waveguide including a slab region 232, a projection 231, a lower clad 233, a core 234, an upper clad 235, and a cap layer 236. The core 234 has a higher refractive index than the lower clad 233 and the upper clad 235, thus achieving optical confinement in a vertical direction on the surface.

The foregoing waveguides achieve optical confinement basically in a lateral direction (or a planar direction) by use of the projections 201, 211, 221, and 231. As materials used to form the foregoing waveguides, for example, it is possible to use semiconductors such as Si, Ge, SiGe, SiC, SiSn, PbS, PbSe, GaAs, InP, GaP, GaN, GaAlAs, GaInAsP, and ZnSe. Alternatively, it is possible to use dielectrics such as $LiNbO_3$. Additionally, the cap layers 215, 226, and 236 can be formed using a gaseous region such as air, a liquid region such as water, or a vacuum region.

First Embodiment

FIG. 1(a), (b) shows a high-order mode filter 300 according to the first embodiment of the present invention. The high-order mode filter 300 includes a projection 301 and a slab region 302, wherein the projection 301 achieves optical confinement in a lateral direction. The high-order mode filter 300 is formed by alternately connecting the configuration including a first optical waveguide 304 and a second optical waveguide 305 at least one or more times. In the first optical waveguide 304, a disturbance element 303 with a lower refractive index than the slab region 302 is disposed at part of the slab region 302 isolated from the projection 301 by doping impurities into the slab region 302. Herein, the refractive index represents a real part of a complex refractive index. In contrast, at least part of the second optical waveguide 305 proximate to the projection 301 does not include a disturbance element. In this connection, it is possible to form a disturbance element in the second optical waveguide 305, wherein it is necessary that the isolated distance between the projection 301 and a disturbance element in the second optical waveguide 305 be larger than the isolated distance between the projection 301 and a disturbance element in the first optical waveguide 304.

In addition to the projection 301, the disturbance element 303 contributes to optical confinement in a lateral direction in the first optical waveguide 304, and therefore a high-order mode width of the first optical waveguide 304 is smaller than that of the second optical waveguide 305. Thus, mismatching occurs in a high-order mode electric-field profile at a connecting face 311 between the first optical waveguide 304 and the second optical waveguide 305, thus causing a high-order mode loss while removing high-order mode light.

Unlike the high-order mode filter of Patent Literature Document 3, the high-order mode filter 300 does not need to carry out etching to form terraces. Since the disturbance element 303 is formed by doping impurities into the slab region 302, it is unnecessary to apply a resist mask onto the step-difference structure, but it is necessary to carry out etching to form the projection 301 in the manufacturing process of the high-order mode filter 300. Therefore, it is possible to easily manufacture the high-order mode filter 300 compared to the high-order mode filter of Patent Literature Document 3.

In the high-order mode filter 300, the slab region 302 and the disturbance element 303 are basically formed using the same material, wherein impurity doping may induce small variations of refractive indexes about 0.1 in the disturbance element 303. That is, the effective refractive index of high-order mode light may undergo small variations at the connecting face 311 between the first optical waveguide 304 and the second optical waveguide 305. For this reason, the high-order mode filter 300 does not have the problem of the high-order mode filter of Patent Literature Document 3 regarding frequent occurrence of reflected light.

Most of high-order mode light which is removed at the connecting face 311 between the first optical waveguide 304 and the second optical waveguide 305 is converted into thermal energy via optical absorption such as absorption of free carriers which occur in the disturbance element 303 due to impurity doping. Thus, the high-order mode filter 300 does not have the problem of the high-order mode filter of Patent Literature Document 3 in which high-order mode light removed at the connecting face between the first optical waveguide and the second optical waveguide is emitted outside of the slab region to serve as stray light in optical elements.

Due to a small difference of about 0.1 between the refractive indexes of the slab region 302 and the disturbance region 303, the high-order mode filter 300 may not achieve a high performance of removing high-order mode light as the high-order mode filter of Patent Literature Document 3.

For this reason, it is necessary to adjust the phase relationship between the removable high-order mode and the intentional high-order mode which derives from that the removable high-order mode at the connecting face 311 between the first optical waveguide 304 and the second optical waveguide 305 in the high-order mode filter 300. Thus, it is possible to demonstrate a high performance of removing high-order mode light in the high-order mode filter 300. The method and the principal of adjusting the phase relationship between the removable high-order mode and the intentional high-order mode will be described below.

Due to mismatching occurring in the high-order mode electric-field profile at the connecting face 311 between the first optical waveguide 304 and the second optical waveguide 305, the removable high-order mode can be turned into the corresponding high-order mode and the intentional high-order mode having a higher order. The phase of the intentional high-order mode is determined to minimize the optical loss thereof, thus fixing the phase relationship between the removable high-order mode and the intentional high-order mode.

Due to a difference between the effective refractive indexes of the removable high-order mode and the intentional high-order mode which derives from the removable high-order mode, the phase relationship between the removable high-order mode and the intentional high-order mode will be varied during optical propagation from one connecting face 311 to the next connecting face 311. Herein, $\Delta\phi$ represents a phase difference between the removable high-order mode and the intentional high-order mode which arrive at the next connecting face 311 from one connecting face 311. When Equation 4 is established, a phase difference between the removable high-order mode and the intentional high-order mode becomes opposite to the initial phase difference between them, and therefore it is possible to efficiently remove higher modes since mode conversion may maximize the removable high-order mode loss. In Equation 4, m denotes an integer equal to or above 1.

$$|\Delta\phi|=(2m-1)\pi \qquad \text{[Equation 4]}$$

When Equation 5 is established, a phase difference between the removable high-order mode and the intentional high-order mode is identical to the initial phase difference, and therefore most of the intentional high-order mode energy is reduced again to the removable high-order mode, thus reducing the performance of the high-order mode filter 300.

$$|\Delta\phi|=2m\pi \qquad \text{[Equation 5]}$$

Optical energy of a high-order mode will be shifted to a further high-order mode while light passes through the connecting face 311 between the first optical waveguide 304 and the second optical waveguide 305 in the high-order mode filter 300, wherein, as the degree of a high-order mode becomes higher, mismatching between different modes at the connecting face 311 becomes larger so as to increase losses. For this reason, the high-order mode filter 300 may not suffer from a problem due to a further high-order mode which derives from a high-order mode.

It is possible to improve an efficiency of removing higher modes when $L_1$ and $L_2$ representing the lengths of the first optical waveguide 304 and the second optical waveguide 305 in the optical-waveguide direction are set to satisfy Equation 4. That is, it is preferable that the values of $L_1$, $L_2$ be approximate to the values represented by Equation 6. Herein, $\lambda$ denotes the wavelength of light in a vacuum; $n_1^{eff1}$ denotes an effective refractive index of the removable high-order mode in the first optical waveguide 304; $n_1^{eff2}$ denotes an effective refractive index of the intentional high-order mode in the first optical waveguide 304; $n_2^{eff1}$ denotes an effective refractive index of the removable high-order mode in the second optical waveguide 305; $n_2^{eff2}$ denotes an effective refractive index of the intentional high-order mode in the second optical waveguide 305.

$$L_i = \frac{(2m-1)\lambda}{2\left(n_i^{eff1} - n_i^{eff2}\right)} \quad (i=1,2) \qquad \text{[Equation 6]}$$

When m=1 in Equation 4, the values of $L_1$, $L_2$ become minimum while a performance of removing higher modes per unit length becomes maximum. At this time, $L_1$, $L_2$ have values $L_1^{opt}$, $L_2^{opt}$, which are expressed via Equation 7.

$$L_i^{opt} = \frac{\lambda}{2\left(n_i^{eff1} - n_i^{eff2}\right)} \quad (i=1,2) \qquad \text{[Equation 7]}$$

Therefore, it is preferable that the values of $L_1$, $L_2$ be approximate to $L_1^{opt}$, $L_2^{opt}$ expressed in Equation 7. When the values of $L_1$, $L_2$ are set to satisfy Equation 5, an efficiency of removing higher modes may be conversely decreased in the high-order mode filter 300. That is, it is preferable that the values of $L_1$, $L_2$ not be approximate to the values expressed in Equation 8.

$$L_i = \frac{m\lambda}{n_i^{eff1} - n_i^{eff2}} \quad (i=1,2) \qquad \text{[Equation 8]}$$

When the variation $\Delta\phi$ representing a phase difference between the removable high-order mode and the intentional high-order mode is deviated from Equation 4, the removable high-order mode loss may not become maximum at the connecting face between the first optical waveguide 304 and the second optical waveguide 305. However, when the length of the optical waveguide following the connecting face 311 is set to compensate for a deviation of the variation $\Delta\phi$ regarding a phase difference, it is possible to achieve a large high-order mode loss at the next connecting face 311. That is, when $\Delta\phi_1$, $\Delta\phi_2$ corresponding to variations $\Delta\phi$ of phase differences in the first optical waveguide 304 and the second optical waveguide 305 do not satisfy Equation 4 but satisfies Equation 9, it is expected to achieve a high effect of removing higher modes in the high-order mode filter 300.

$$|\Delta\phi_1+\Delta\phi_2|=2m\pi \qquad \text{[Equation 9]}$$

However, when the variations $\Delta\phi_1$, $\Delta\phi_2$ of the phase differences of the first optical waveguide 304 and the second optical waveguide 305 satisfy Equation 10, an efficiency of removing higher modes is decreased in the high-order mode filter 300.

$$|\Delta\phi_1+\Delta\phi_2|=(2m-1)\pi \qquad \text{[Equation 10]}$$

Therefore, when the lengths $L_1$, $L_2$ of the first optical waveguide 304 and the second optical waveguide 305 satisfy Equation 9, in other words, when they are approximate to the value satisfying Equation 11, it is expected to achieve a high effect of removing higher modes in the high-order mode filter 300.

$$L_2^{opt}L_1 + L_1^{opt}L_2 - 2m \cdot L_1^{opt}L_2^{opt} = 0 \qquad \text{[Equation 11]}$$

In contrast, when the lengths $L_1$, $L_2$ of the first optical waveguide 304 and the second optical waveguide 305 satisfy Equation 10, in other words, when they are approximate to the value satisfying Equation 12, an efficiency of removing higher modes is decreased in the high-order mode filter 300.

$$L_2^{opt}L_1 + L_1^{opt}L_2 - (2m-1)\cdot L_1^{opt}L_2^{opt} = 0 \quad \text{[Equation 12]}$$

Figure 3:
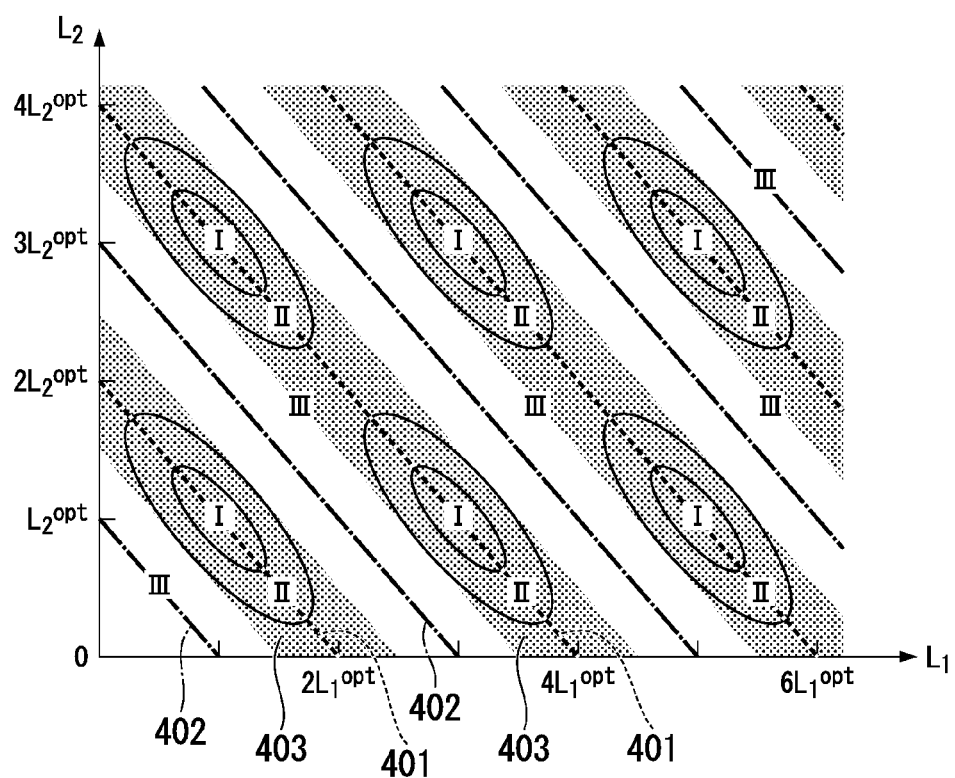
FIG. 3 is a graph showing a distribution of high-order mode removable performance in an $L_1$-$L_2$ plane in which the horizontal axis represents a length $L_1$ of a first optical waveguide of a high-order mode filter while the vertical axis represents a length $L_2$ of a second optical waveguide.

FIG. 3 is a graph showing distributions of high-order mode removing performances in the high-order mode filter 300. Herein, values calculated via Equation 11 and Equation 12 are plotted in the $L_1$-$L_2$ plane in which the horizontal axis represents the length $L_1$ of the first optical waveguide 304 while the vertical axis represents the length $L_2$ of the second optical waveguide 305. In FIG. 3, lines 401 of Equation 11 and lines 402 of Equation 12 alternately appear in the L1-L2 plane. Points proximate to lines 401 of Equation 11 are distributed in band-shaped areas 403 of Equation 13, and therefore it is expected to achieve a high effect of removing higher modes in the band-shaped areas 403.

$$|L_2^{opt}L_1 + L_1^{opt}L_2 - 2m\cdot L_1^{opt}L_2^{opt}| < L_1^{opt} < L_1^{opt}L_2^{opt} \quad \text{[Equation 13]}$$

When the lengths $L_1$, $L_2$ of the first optical waveguide 304 and the second optical waveguide 305 do not satisfy Equation 13, an effect of removing higher modes is decreased in the high-order mode filter 300. However, when the lengths $L_1$, $L_2$ of the first optical waveguide 304 and the second optical waveguide 305 do not satisfy Equation 13 as well as Equation 8, an efficiency of removing higher modes is decreased in the high-order mode filter 300.

It is possible to summarize that an efficiency of removing higher modes in the high-order mode filter 300 is decreased in the order of areas I, II, and III in FIG. 3. Specifically, the lengths L1, L2 of the first optical waveguide 304 and the second optical waveguide 305 satisfying Equation 13 are plotted close to the points satisfying Equation 6 in the area I of FIG. 3. In this case, it is expected to achieve a high effect of removing higher modes in the high-order mode filter 300. In particular, it is expected to achieve the maximum effect of removing higher modes at the points close to $L_1 = L_1^{opt}$, $L_2 = L_2^{opt}$.

In the area II of FIG. 3, the lengths $L_1$, $L_2$ of the first optical waveguide 304 and the second optical waveguide 305 satisfy Equation 13, but plotted points of those lengths are not proximate to the points satisfying Equation 6 or Equation 8. In this case, the high-order mode filter 300 may demonstrate an intermediate effect of removing higher modes. In the area III of FIG. 3, the lengths $L_1$, $L_2$ of the first optical waveguide 304 and the second optical waveguide 305 do not satisfy Equation 13, or plotted points of those lengths are proximate to the points satisfying Equation 8. In this case, the high-order mode filter 300 is degraded in an effect of removing higher modes.

The intentional high-order mode deriving from the removable high-order mode has a higher order than the removable high-order mode but has the same symmetry as the removable high-order mode. For example, an odd-symmetric high-order mode may produce an odd-symmetric high-order mode having a higher degree in an X direction. Additionally, an even-symmetric high-order mode may produce an even-symmetric high-order mode having a higher degree. Therefore, it can be said that, by neglecting the symmetry in a Y direction, a j-order mode having j antinodes may produce a j+2-order mode, a j+4-order mode, a j+6-order mode, etc.

When a plurality of intentional high-order modes exist, the length $L_i^{opt}$ of an optical waveguide may be slightly varied depending on the effective refractive index. Among a plurality of intentional high-order modes, the intentional high-order mode having the lowest degree may produce the largest number of components which may cause a high impact. For example, when three intentional high-order modes such as the j+2-order mode, the j+4-order mode, and the j+6-order mode exist, the j+2-order mode has the maximum impact; hence, it is possible to calculate length $L_i^{opt}$ of an optical waveguide based on the j+2-order mode. Since the optimum length of an optical waveguide exists proximate to Liopt, it is preferable to execute parameter scanning on the neighborhood of Liopt by way of numerical calculation, thus producing the optimum value.

The aforementioned high-order mode filter 300 may function effectively even when the result of the mode analysis on optical waveguides shows nonexistence of modes whose degrees are higher than the removable high-order mode and which has the same symmetry as the removable high-order mode. Irrespective of nonexistence of clear high-order modes serving as modes of optical waveguides, it is possible to assume that a high-order mode, serving as a leaking mode coupled with the slab mode of the slab region 302, may exist with a significant optical-waveguide life. In this case, it is possible to use the effective refractive index of a two-dimensional slab basic mode, which is calculated with respect to the high-order mode filter 300 solely including the slab region 302 while virtually precluding the projection 301, as $n_i^{eff2}$ of the intentional high-order mode of an optical waveguide according to Equation 6, Equation 7, and Equation 8.

Assuming that a plurality of removable high-order modes exists, it is possible to calculate the length $L_i^{opt}$ of an optical waveguide by use of the removable high-order mode having the lowest degree. This is because the optical loss at the connecting face 311 between the first optical waveguide 304 and the second optical waveguide 305 becomes higher as the degree of a high-order mode becomes higher, wherein the high-order mode filter 300 may demonstrate a high effect of removing higher modes even when the values of $L_1$, $L_2$ are deviated from the optimum value. It is further preferable to execute parameter scanning on the neighborhood of $L_i^{opt}$ by way of numerical calculation, thus calculating the optimum value of the length of an optical waveguide.

According to the above guidance, it is possible to determine the lengths $L_1$, $L_2$ of the first optical waveguide 304 and the second optical waveguide 305 in the optical-waveguide direction such that a significant high-order mode loss may occur at the connecting face 311 due to interference between the removable high-order mode and the intentional high-order mode.

Using a basic-mode wavelength $\lambda_{mode}$ in an optical waveguide, the length $L_i^{opt}$ of an optical waveguide should be equal to or higher than $3\lambda_{mode}$, typically about $10\lambda_{mode}$. Using a refractive index $n_{core}$ of a core of an optical waveguide and a mode width W, the effective refractive index of a j-order mode having j antinodes in the X direction and one antinode in the Y direction can be expressed using Equation 14.

$$n^{eff} \approx n_{core} - \frac{j^2 \lambda^2}{8 n_{core} W^2} \quad \text{[Equation 14]}$$

In Equation 14, the mode width W is defined by Equation 15 using a wave number $k_x$.

$$W = \frac{j\pi}{k_x} \quad \text{[Equation 15]}$$

Assuming that the second-order mode corresponding to the high-order mode having the lowest degree is set to the removable high-order mode while the fourth-order mode having the same symmetry as the second-order mode is set to the intentional high-order mode, it is possible to obtain Equation 16 by assigning the effective refractive index, produced via Equation 14, to Equation 7. In Equation 16, W2 denotes the mode width of the second-order mode which is removable.

$$L_i^{opt} = \frac{\lambda}{2(n_i^{eff1} - n_i^{eff2})} > \frac{n_{core}W_2^2}{3\lambda}$$ [Equation 16]

$$= \frac{W_2^2}{3\lambda_{mode}^2}\lambda_{mode}$$

Using generally-known inequalities of $W_2 > 1.5$ μm, $\lambda_{mode} < 0.5$ μm, Equation 16 results in $L_i^{opt} > 3\lambda_{mode}$. Compared with the high-order mode filter of Patent Literature Document 2 in which the length of a light-wave reducing loss element in an optical-waveguide direction is approximately $0.25\lambda_{mode}$, the high-order mode filter 300 includes the disturbance element 303 whose length in an optical-waveguide direction is one or more digits longer than the length of a light-wave reducing loss element. That is, it is possible to easily manufacture the high-order mode filter 300 by way of generally-known fine processing technologies.

The high-order mode filter 300 in which the phase relationship between the removable high-order mode and the intentional high-order mode can be fixed automatically is installable in various optical elements having optical waveguides, wherein the high-order mode filter 300 can be disposed at any positions without any limitations in optical elements. Additionally, the high-order mode filter 300 does not utilize interference with a basic mode, and therefore the high-order mode filter 300 may stably demonstrate a performance of removing higher modes irrespective of the existence/nonexistence of a basic mode and the phase of a basic mode.

The high-order mode filter 300 can achieve a high performance of removing higher modes irrespective of small variations of the refractive index of the disturbance element 303. That is, it is possible to miniaturize the element length of the high-order mode filter 300. Additionally, the high-order mode filter 300 may hardly cause a basic-mode loss because the disturbance element 303 can be sufficiently isolated from the basic mode.

Figure 2:
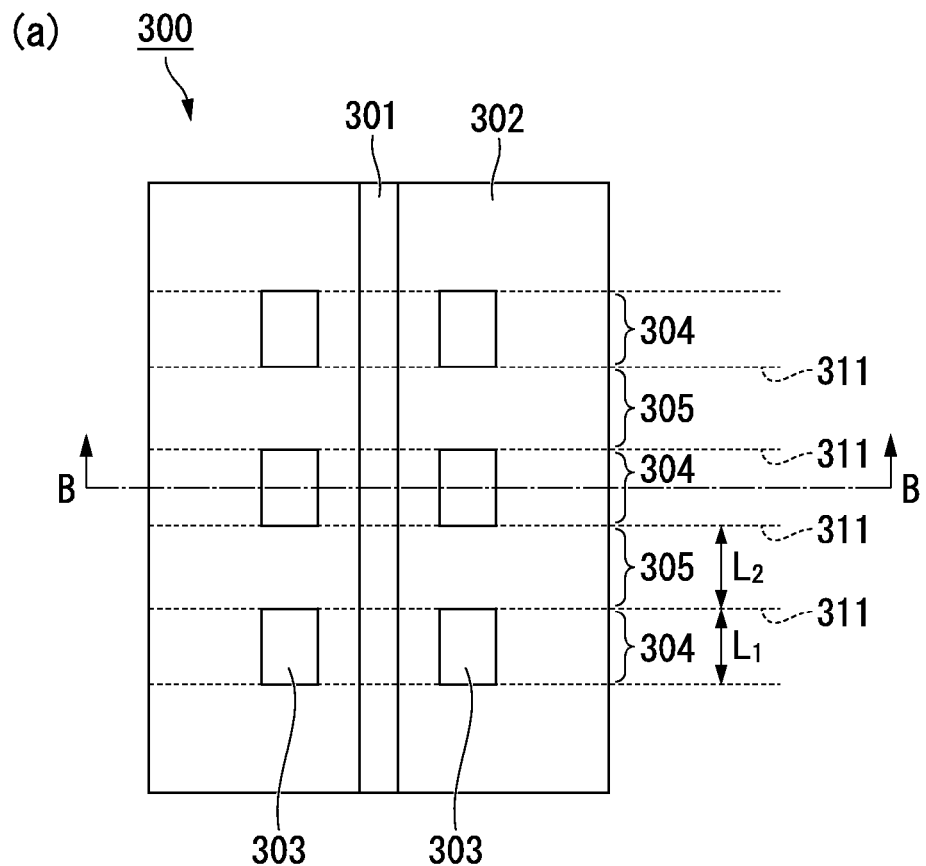
FIG. 2 shows the configuration of a high-order mode filter according to a first embodiment of the present invention, wherein (a) shows a plan view, and (b) shows a cross-sectional view taken along line B-B.
Figure 2:
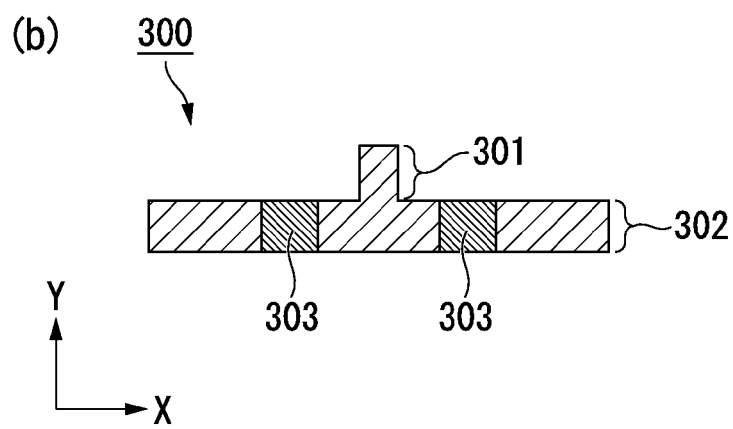
Figure 4:
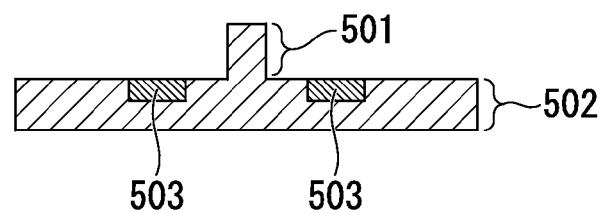
FIG. 4 shows variations of the configuration of the high-order mode filter including a projection, a slab region, and a disturbance element, wherein (a), (b), (c) show cross-sectional views with different positional relationships regarding a disturbance element in a slab region.
Figure 4:
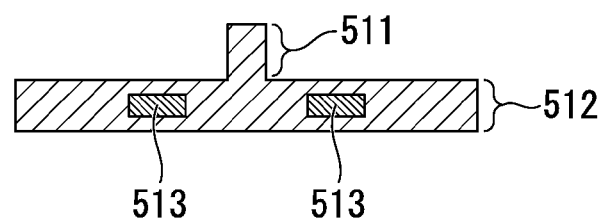
Figure 4:
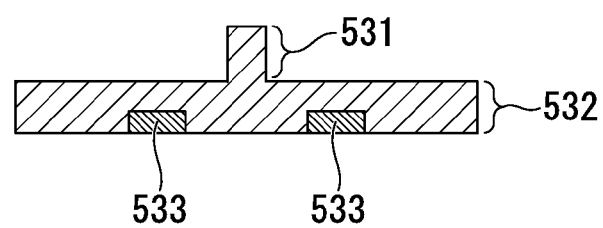

As shown in FIG. 2(b), the thickness of the disturbance element 303 is not necessarily identical to the thickness of the slab region 302 in the high-order mode filter 300. In the high-order mode filter 300, the positional relationship between the projection 301, the slab region 302, and the disturbance element 303 is not necessarily limited to the configuration of FIG. 2(b). FIG. 4 shows a variation in which the height of a disturbance element is reduced to be smaller than the thickness of a slab region while the position of a disturbance element embedded in a slab region is changed. FIG. 4(a) shows a variation in which a disturbance element 503 is embedded in a slab region 502 having a projection 501, wherein the disturbance element 503 is embedded in the slab region 502 with the predetermined thickness below the surface of the slab region 502. FIG. 4(b) shows a variation in which a disturbance element 513 is embedded in a slab region 512 having a projection 511, wherein the disturbance element 513 is completely embedded in the slab region 512 with the predetermined thickness. FIG. 4(c) shows a variation in which a disturbance element 533 is embedded in a slab region 532 having a projection 531, wherein the disturbance element 533 is embedded in the slab region 532 with the predetermined thickness above the back of the slab region 532.

In high-order mode filters, it is necessary that the refractive index of a disturbance element be decreased to be lower than the refractive index of a slab region adjoining a disturbance element in a planar direction. In the rib waveguide shown in FIG. 1(b) and the high-mesa waveguide shown in FIG. 1(d) in which the slab regions 212 and 232 are each made of a single material, it is possible to form disturbance elements with lower refractive indexes than the refractive indexes of the slab regions 212 and 232 surrounding disturbance elements by doping impurities into the material. In the ridge waveguide shown in FIG. 1(c) in which the slab region 222 includes the lower clad 223, the core 224, and the upper clad 225, it is possible to form a disturbance element in each constituent element of the slab region 222, wherein it is possible to form a disturbance element with a lower refractive index than the refractive index of the slab region 222 adjoining the disturbance element in the planar direction by way of impurity doping.

In a high-order mode filter, a pair of disturbance elements is not necessarily formed on both sides of a projection in a slab region, but a disturbance element can be formed on one side of a projection in a slab region. When a pair of disturbance elements is formed on both sides of a projection in a slab region, it is expected to achieve a high effect of removing higher modes because of an increase of mode mismatching at a connecting face between a first optical waveguide and a second optical waveguide. Additionally, it is possible to adjust the refractive index and the absorption coefficient of a disturbance element by increasing or decreasing a doping density applied to a disturbance element formed in a slab region of a high-order mode filter. That is, it is necessary to design a high-order mode filter with a high degree of freedom in consideration of requirements of reducing reflected light and stray light.

Next, variations of the first embodiment will be described with reference to FIGS. 5 to 8.

Figure 5:
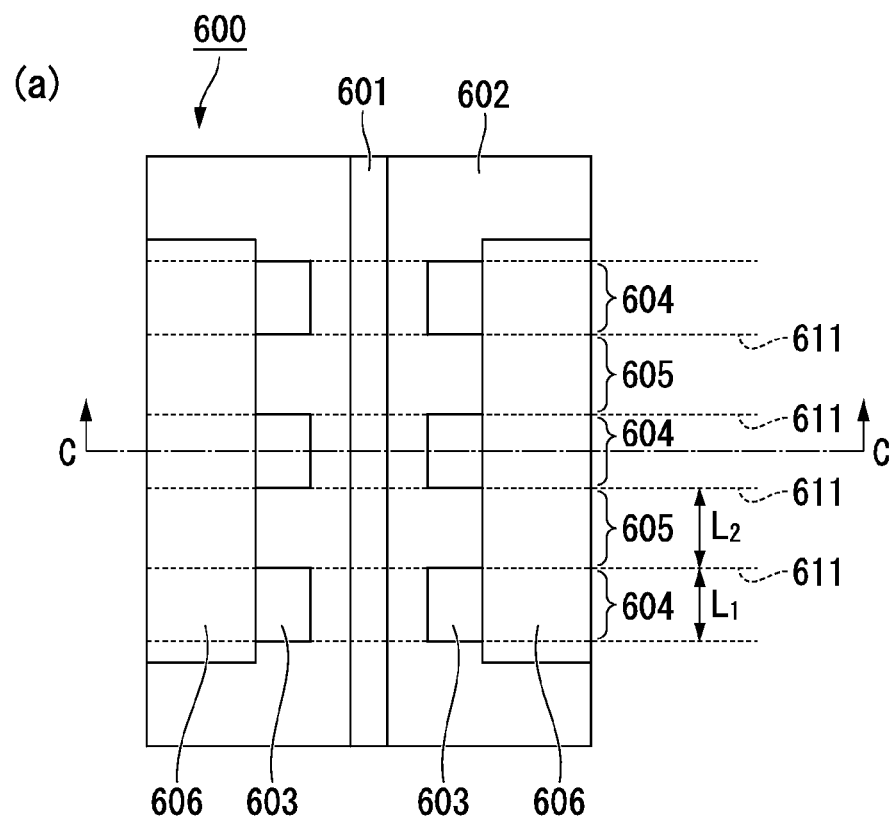
FIG. 5 shows the configuration of a high-order mode filter according to a first variation, wherein (a) shows a plan view, and (b) shows a cross-sectional view taken along line C-C.
Figure 5:
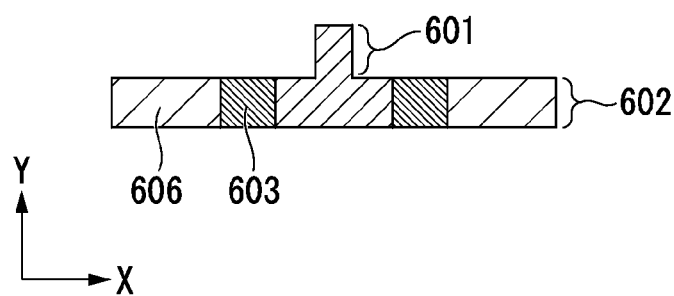

FIG. 5(a), (b) show a high-order mode filter 600 according to a first variation, which includes a projection 601, a slab region 602, a disturbance element 603, a first optical waveguide 604, a second optical waveguide 605, and a connecting face 611. In the high-order mode filter 600, an optical absorption area 606 which is made of an optical absorption material is disposed at a far side of the slab region 602 which is distanced from the disturbance element 603 apart from the projection 601 in connection with at least one of the first optical waveguide 604 and the second optical waveguide 605. It is possible to prevent high-order mode light from being introduced into the other area as stray light since the optical absorption area 606 is able to absorb the removed high-order mode light. It is possible to form the optical absorption area 606 by doping impurities into the semiconductor. It is possible to apply different doping densities to the optical absorption area 606 and the disturbance element 603. As shown in FIG. 5, the optical absorption area 606 may be disposed adjacent to the disturbance element 603. Alternatively, the optical absorption area 606 may be separated from the disturbance element 603.

Unlike the disturbance element 603, the thickness of the optical absorption area 606 does not necessarily match the thickness of the slab region 602. For example, the thickness of the optical absorption area 606 may be smaller than the thickness of the slab region 602. Alternatively, the optical absorption area 606 may be embedded in the slab region 602.

It is unnecessary to fix design values with regard to the lengths of the first optical waveguide 604 and the second optical waveguide 605 in the optical waveguide direction, as well as the shape, size, and position of the disturbance element 603. For example, it is possible to increase allowable errors of structural parameters by deliberately applying dispersion to design values close to optimum design values with respect to the constituent elements of the high-order mode filter 600. Thus, it is possible to reduce the dispersion of the performance of removing higher modes due to manufacturing errors of high-order mode filters.

FIGS. 6(a), (b) show a high-order mode filter 700 according to a second variation, which includes a projection 701, a slab region 702, a disturbance element 703, a first optical waveguide 704, a second optical waveguide 705, and a connecting face 711. The high-order mode filter 700 is designed to form a tapered structure 706 by which the width of the projection 701 is continuously varied (i.e. gradually increased) in proximity to at least one of a start end and a terminal end of the projection 701. Due to a small width of the projection 701, a high-order mode electric field may be largely leaked into the slab region 702, thus increasing a high-order mode loss at the connecting part 711 between the first optical waveguide 704 and the second optical waveguide 705. However, it is necessary to pay attention to the potential of causing higher modes with the tapered structure 706 and the potential of increasing a basic-mode loss due to processing roughness on side faces of the projection 701. Therefore, it is not necessary to design the high-order mode filter 700 such that the width of the projection 701 is reduced to be equivalent to that of a single-mode waveguide.

FIGS. 7(a), (b) show a high-order mode filter 800 according to a third variation, which includes a projection 801, a slab region 802, a disturbance element 803, a first optical waveguide 804, a second optical waveguide 805, an optical absorption area 806, and a connecting face 811. In the high-order mode filter 800, at least part of the disturbance element 803 and the optical absorption area 806 is made of p-type semiconductor or n-type semiconductor. The high-order mode filter 800 includes a p-type semiconductor area 807 covering the disturbance element 803 and the optical absorption area 806, an n-type semiconductor area 808 covering the disturbance element 803 and the optical absorption area 806, and an electrode 809. That is, a pn diode structure and a pin diode structure are formed in the high-order mode filter 800, and therefore it is possible to change the refractive index and the optical absorption coefficient with respect to the disturbance element 803 and the optical absorption area 806 by controlling the number of free carriers with a voltage applied to the electrode 809. Thus, it is possible to adjust the performance of removing higher modes after manufacturing.

The above technological guidance can be applied to optical modulators. An optical modulator includes a p-type semiconductor area and an n-type semiconductor area to implement optical modulation. According to the above technological guidance applied to an optical modulator, it is possible to achieve the function of a disturbance element or an optical absorption area with a p-type or n-type semiconductor area. That is, it is possible to achieve the function of a high-order mode filter with an optical modulator.

FIGS. 8(a), (b) show a high-order mode filter 900 according to a fourth variation, which includes a projection 901, a slab region 902, a disturbance element 903, a first optical waveguide 904, a second optical waveguide 905, an optical absorption area 906, and a connecting face 911. In the high-order mode filter 800 of the third variation in which the disturbance element 803 and the optical absorption area 806 are formed by doping impurities into the semiconductor, the removed high-order mode is absorbed by free carriers and finally converted into thermal energy. To improve this drawback, the high-order mode filter 900 is designed such that a temperature sensor element 907 is disposed in proximate to the disturbance element 903 and the optical absorption area 906. That is, it is possible to detect existence/nonexistence of higher modes by monitoring the temperature of the disturbance element 903 and the optical absorption area 906 with the temperature sensor element 907. As the method of estimating temperature in the predetermined area, it is possible to use the temperature dependency of the resistances of metal materials and the temperature dependency of a forward current of a pn diode. In the high-order mode filter 900, the temperature sensor element 907 made of a material whose resistance is significantly varied depending on temperature is disposed above the optical absorption area 906 while a pair of electrodes 908 is disposed at both ends of the temperature sensor element 907, wherein it is possible to monitor the temperature of the optical absorption area 906 by detecting resistance between the electrodes 908.

The above high-order mode filter may work effectively as long as a projection confines light in the lateral direction in an optical waveguide. In the basic mode of the optical waveguide, light can be confined in the neighbor of the projection. In contrast, high-order mode light may be leaked towards a slab region. Thus, a high-order mode may cause a high mode variation loss solely at a higher mode at the connecting part between a first optical waveguide and a second optical waveguide.

As described above, the foregoing high-order mode filters according to the first embodiment and variations are each designed to have a structure of alternately connecting a pair of a first optical waveguide, furnished with a disturbance element having a lower refractive index than at least part of a slab region, and a second optical waveguide, which has no disturbance element or in which a distance between a projection and a disturbance element is larger than that of a first optical waveguide, at least one time, wherein a disturbance element is formed by doping impurities into a semiconductor material in a slab region apart from a projection. That is, it is possible to easily manufacture the foregoing high-order mode filters which are able to suppress reflected light and stray light.

In the foregoing high-order mode filters, the lengths $L_1$, $L_2$ of a first optical waveguide and a second optical waveguide in an optical waveguide direction are determined to fix the phase relationship between a removable high-order mode $M_1$ and an intentional high-order mode $M_2$ ($M_2 > M_1$) at a connecting face between a first optical waveguide and a second optical waveguide, thus causing a significant high-order mode loss due to interference between the removable high-order mode $M_1$ and the intentional high-order mode $M_2$. Compared with simple high-order mode filters, the foregoing high-order mode filters are able to demonstrate high performance of removing higher modes. Therefore, it is possible to miniaturize the foregoing high-order mode filters.

In the high-order mode filter 600 of the first variation shown in FIG. 5, the optical absorption area 606 made of an optical absorption material is disposed at the far side of the slab region 602 which is further distanced from the disturbance element 603 apart from the projection 601. It is possible to prevent high-order mode light from being introduced into the other area as stray light since the high-order mode filter 600 is able to absorb the removed high-order mode light.

In the high-order mode filter 600, it is not necessary to fix the lengths of the first optical waveguide 604 and the second optical waveguide 605 in the optical waveguide direction, the position, size, and shape of the disturbance element 603 to the predetermined design values. That is, it is necessary to deliberately apply dispersion to design values of constituent elements of the high-order mode filter 600 in proximity to optimum values, thus increasing allowable errors of structural parameters.

Figure 6:
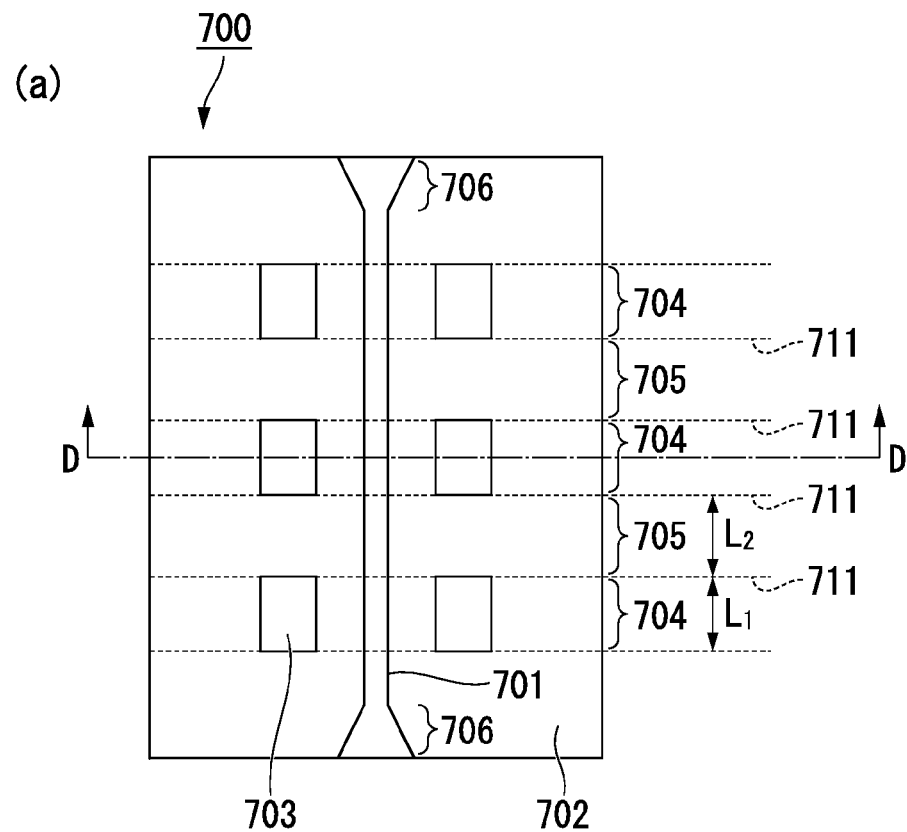
FIG. 6 shows the configuration of a high-order mode filter according to a second variation, wherein (a) shows a plan view, and (b) shows a cross-sectional view taken along line D-D.
Figure 6:
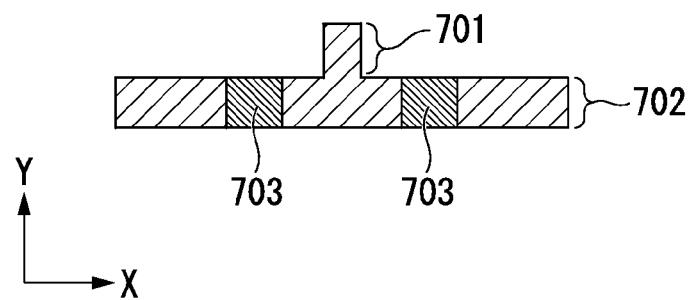

The high-order mode filter 700 of the second variation shown in FIG. 6 is characterized by providing the tapered structure 706 which continuously varying the width of the projection 701, wherein a high-order mode electric field may be largely leaked into the slab region 702 as the width of the projection 701 is decreased to be smaller. Therefore, it is possible to increase a high-order mode loss at the connecting part 711 between the first optical waveguide 704 and the second optical waveguide 705.

Figure 7:
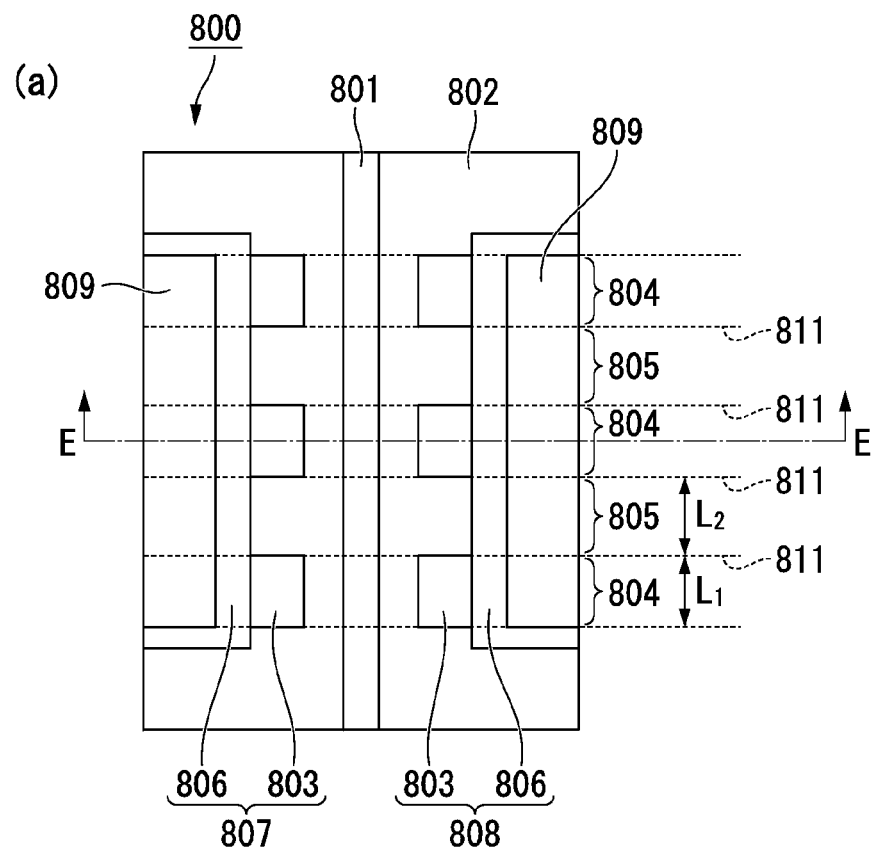
FIG. 7 shows the configuration of a high-order mode filter according to a third variation, wherein (a) shows a plan view, and (b) shows a cross-sectional view taken along line E-E.
Figure 7:
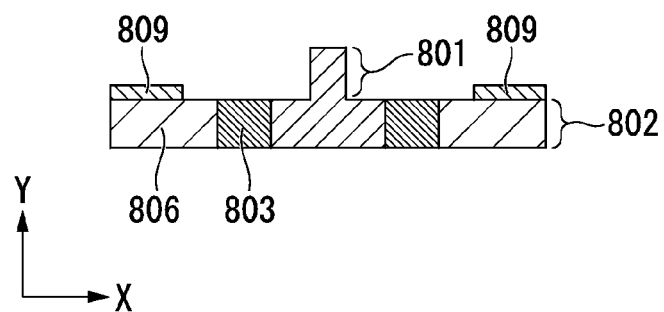

In the high-order mode filter 800 of the third variation shown in FIG. 7, at least part of the disturbance element 803 and the optical absorption area 806 is formed using p-type semiconductor or n-type semiconductor. Therefore, it is possible to change the refractive index and the optical absorption coefficient of the disturbance element 803 and the optical absorption area 806 in the high-order mode filter 800, and therefore it is possible to adjust the performance of removing higher modes after manufacturing.

Figure 8:
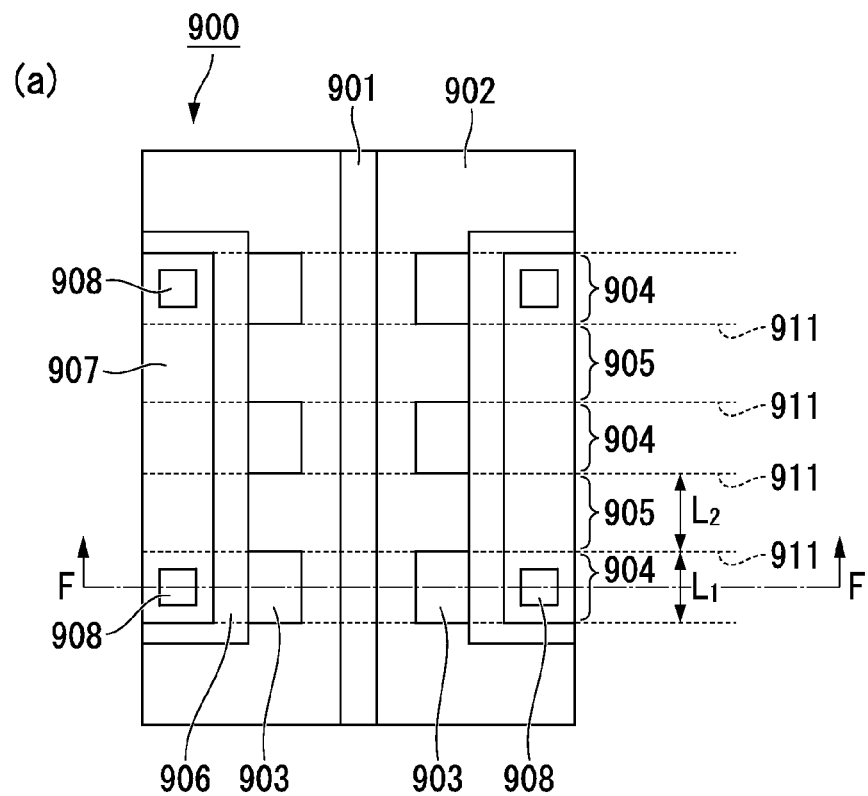
FIG. 8 shows the configuration of a high-order mode filter according to a fourth variation, wherein (a) shows a plan view, and (b) shows a cross-sectional view taken along line F-F.
Figure 8:
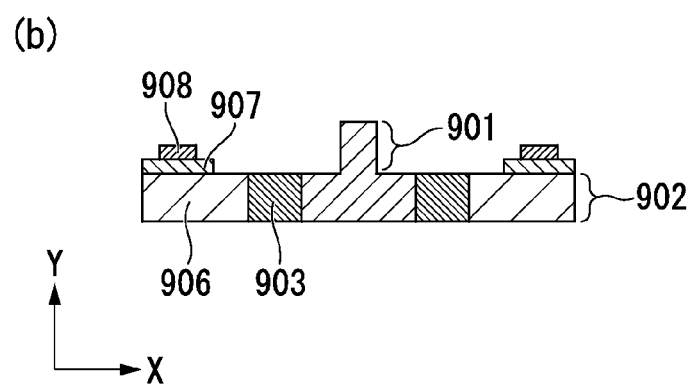

In the high-order mode filter 900 of the fourth variation shown in FIG. 8, it is possible to detect existence/nonexistence of higher modes by monitoring temperature with the temperature sensor element 907 which is disposed close to the disturbance element 803 and the optical absorption area 806.

Second Embodiment

Next, the configuration of a high-order mode filter according to the second embodiment of the present invention and the details of calculation results regarding the performance of removing higher modes will be described in detail. In order to clearly verify the principle and the effect of the present invention, the second embodiment is calculated by specifically defining materials and sizes of constituent elements.

Figure 9:
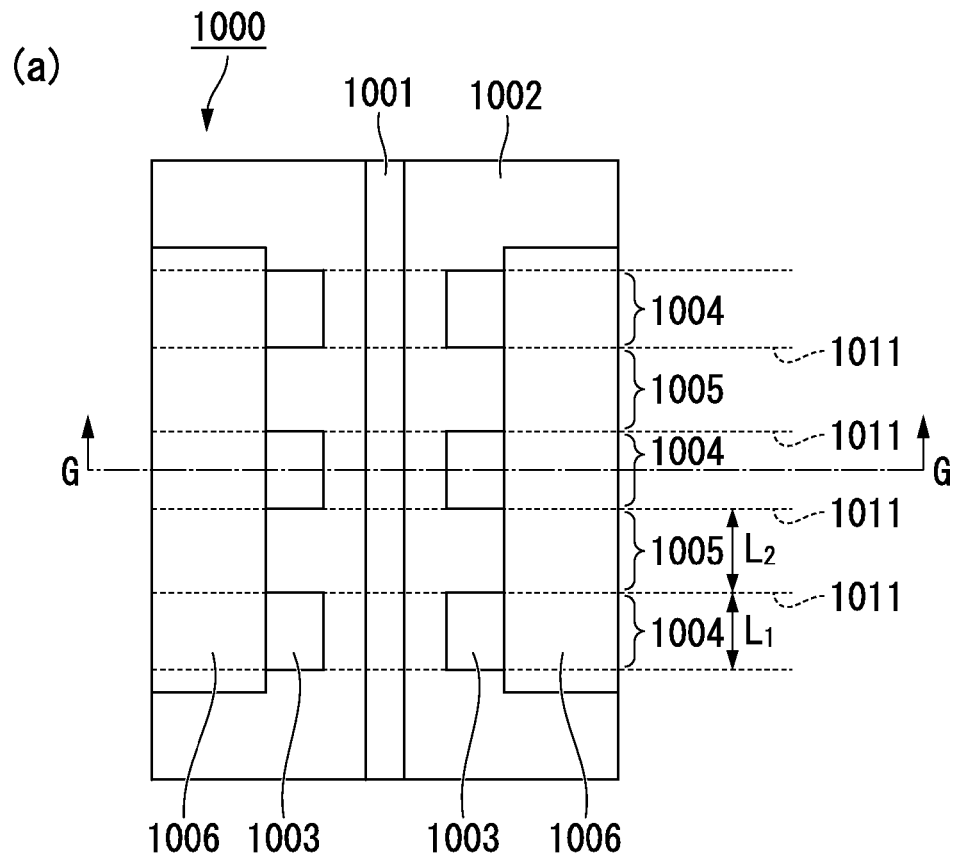
FIG. 9 shows the configuration of a high-order mode filter according to a second embodiment of the present invention, wherein (a) shows a plan view, and (b) shows a cross-sectional view taken along line G-G.
Figure 9:
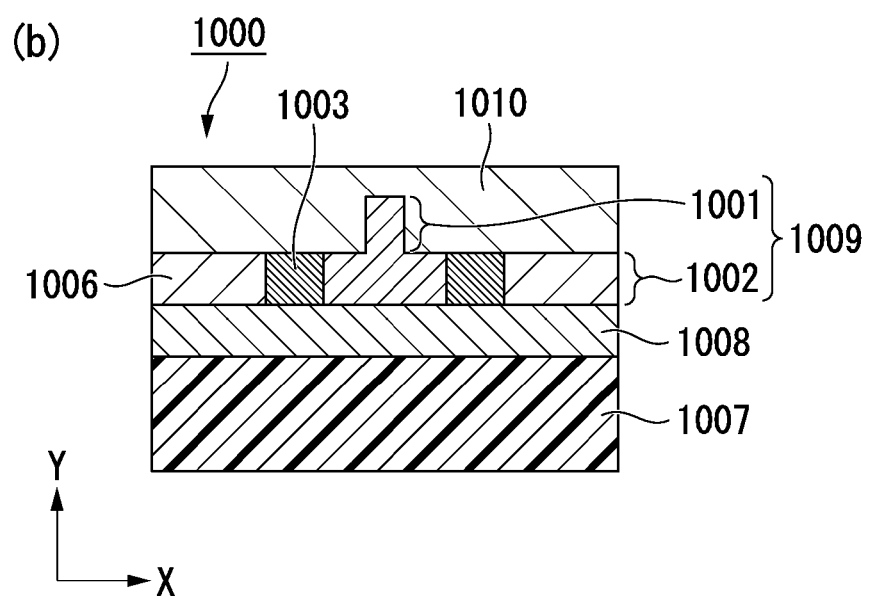

FIGS. 9(a), (b) show a high-order mode filter 1000 according to the second embodiment of the present invention, which includes a projection 1001, a slab region 1002, a disturbance element 1003, a first optical waveguide 1004, a second optical waveguide 1005, an optical absorption area 1006, and a connecting face 1011. The high-order mode filter 1000 includes a silicon substrate 1007 having a refractive index of 3.48 and an embedded oxidation film layer (a BOX layer) 1008 having a refractive index of 1.46. Additionally, the high-order mode filter 1000 has a basic structure serving as a silicon rib waveguide including a silicon layer 1009 having a refractive index of 3.48 and a cap layer 1010 having a refractive index of 1.46. FIG. 9(a) shows the structure of the high-order mode filter 1000, precluding the cap layer 1010, in a plan view.

The silicon layer 1009 includes the slab region 1002 having a thickness of 0.5 μm and the projection 1001 having a height of 0.5 μm and a width of 1.4 μm, wherein the projection 1001 implements optical confinement in the lateral direction. The high-order mode filter 1000 has a configuration of alternately connecting both the first optical waveguide 1004 and the second optical waveguide 1005 twenty times. In the first optical waveguide 1004, the rectangular disturbance element 1003 having a width of 0.6 μm is disposed at a position, distanced from the center of the projection 1001 by 1.3 μm, in the slab region 1002. The disturbance element 1003 is formed by doping impurities of $1\times10^{20}/cm^3$ into a silicon material, wherein the refractive index thereof is 3.38 while the optical absorption coefficient thereof is 1000 $cm^{-1}$.

No disturbance element is disposed in proximate to the projection 1001 in the second optical waveguide 1005. In the first optical waveguide 1004 and the second optical waveguide 1005, the optical absorption area 1006, which is formed by doping impurities of $1\times10^{20}/cm^3$ into a silicon material, is disposed at a position, distanced from the center of the projection 1001 by 1.6 μm or more, in the slab region 1002. Both the optical absorption area 1006 and the disturbance element 1003 have the same refractive index and the same optical absorption coefficient. Additionally, the thickness of the disturbance element 1003 and the optical absorption area 1006 is identical to the thickness of the slab region 1002.

Next, the effect of the present invention will be described together with the numerical analysis results and the default values of the lengths of the first optical waveguide 1004 and the second optical waveguide 1005. A TE-like mode is assumed as the subject of numerical analysis.

Figure 10:
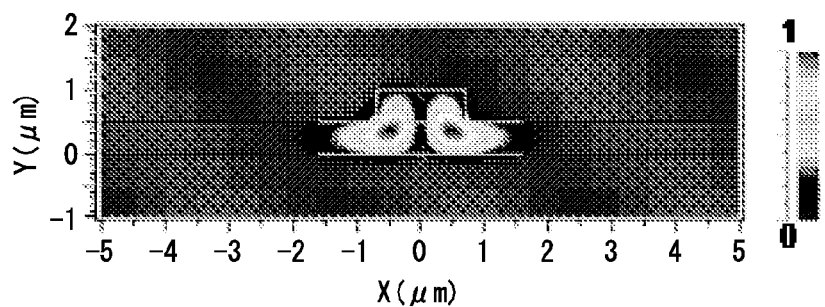
FIG. 10 shows high-order mode electric-field amplitude profiles of high-order mode filters, wherein (a), (b) show second-mode and fourth-mode electric-field amplitude profiles in a second optical waveguide, and (c) shows a basic-mode electric-field amplitude profile of a two-dimensional slab removing a projection.
Figure 10:
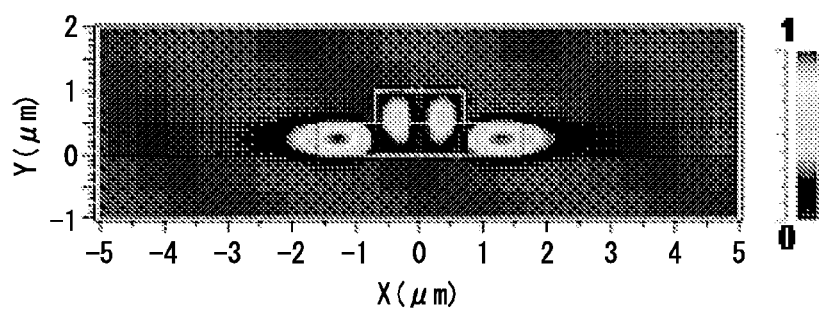
Figure 10:
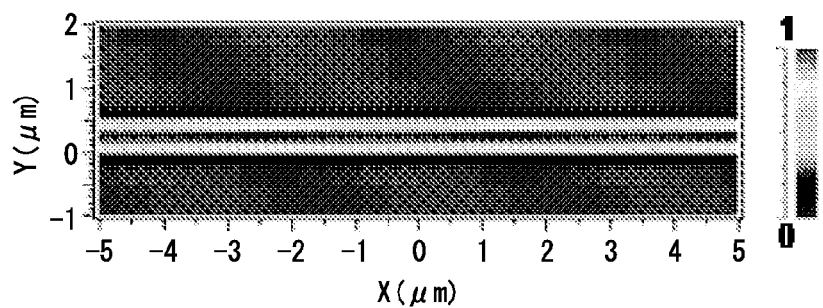

According to the mode analysis of the finite element method, the first optical waveguide 1004 may be involved with first-order to third-order waveguide modes. Herein, a j-order mode is a mode having j antinodes in an X direction. A first-order mode indicates a basic mode. On the other hand, the second optical waveguide 1005 may be involved with first-order to fifth-order waveguide modes. Assuming a second-order mode, i.e. an odd-symmetric mode to the first-order mode, as a removable high-order mode, a fourth-order mode, i.e. an odd-symmetric mode, is assumed as an intentional high-order mode derived from the second-order mode. FIGS. 10(a), (b) show electric-field amplitude profiles of second and fourth orders in the second optical waveguide 1005. FIG. 10(c) shows an electric-field amplitude profile of a two-dimensional slab basic mode with respect to the high-order mode filter 1000 precluding the projection 1001.

The first-order optical waveguide 1004 is not involved with a fourth-order mode but involved with a leaking mode coupled with the two-dimensional slab basic mode shown in FIG. 10(c), wherein the leaking mode has a waveguide life of several tens of mill-meters. Therefore, the leaking mode can be used as the removable high-order mode, wherein the effective refractive index thereof is deemed equivalent to the effective refractive index of the two-dimensional basic mode of the high-order mode filter 1000 precluding the projection 1001.

As a result, the removable high-order mode and the intentional high-order mode of the first optical waveguide 1004 are equal to $n_1^{eff1}=3.288$ and $n_1^{eff2}=3.172$ while the removable high-order mode and the intentional high-order mode of the second optical waveguide 1005 are equal to $n_2^{eff1}=3.293$ and $n_2^{eff2}=3.212$. Using $\lambda=1.55$ μm representing the wavelength of light in a vacuum, Equation 7 produces $L_1^{opt}=6.7$ μm and $L_2^{opt}=10.4$ μm. According to calculation results, the lengths of the first optical waveguide 1004 and the second optical waveguide 1005 in the optical waveguide direction are set to $L_1=6.7$ μm and $L_2=10.4$ μm.

According to the numerical calculation of the semi-vectorial difference beam propagation method, the basic-mode (first-order mode) loss of the high-order mode filter 1000 is decreased to 0.3 dB/mm while the second-order mode loss corresponding to an odd-symmetric mode of the basic mode is increased to 82 dB/mm. Additionally, it is confirmed that light scattered outside the slab region 1002 may hardly occur while all the removed light components of higher mode are absorbed. It is confirmed that, irrespective of concurrent existence of the basic mode and the second-order mode, the high-order mode filter 1000 is not fluctuated in functionality so as to stably demonstrate the performance of removing higher modes. Therefore, it is possible to dispose the high-order mode filter 1000 at arbitrary positions which are not necessarily limited to the inside of optical elements.

Figure 11:
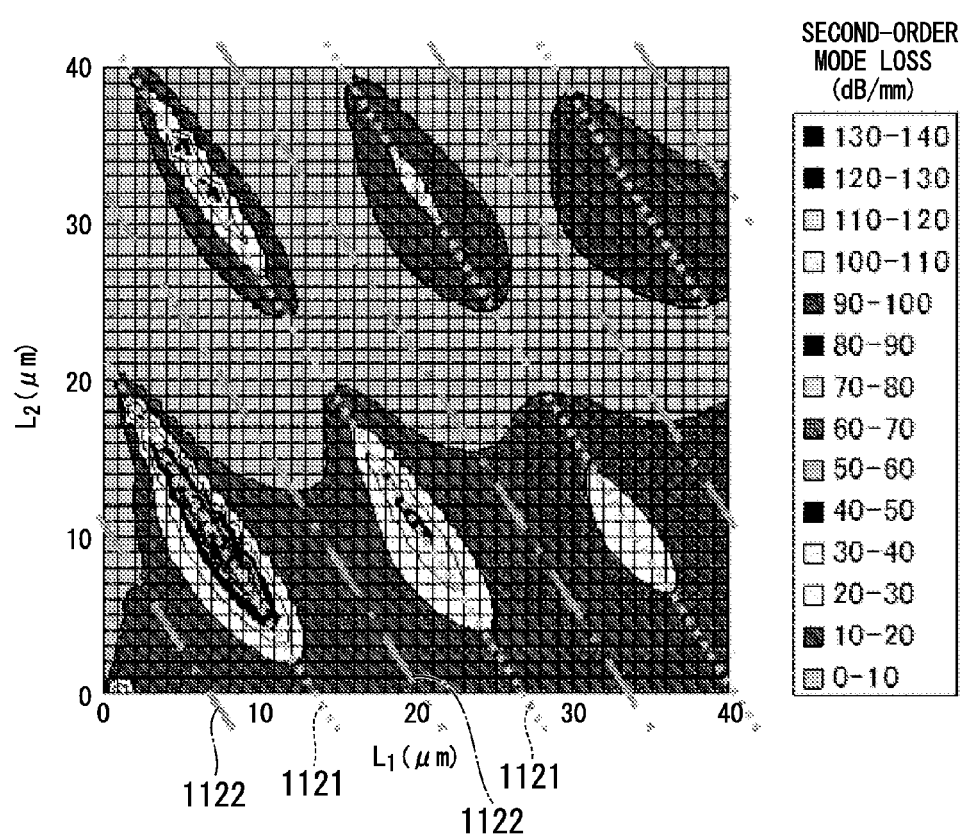
FIG. 11 is a graph showing calculation results regarding high-order mode removal performance of a high-order mode filter 1000 in which the horizontal axis represents the length of a first optical waveguide while the vertical axis represents the length of a second optical waveguide.
Figure 12:
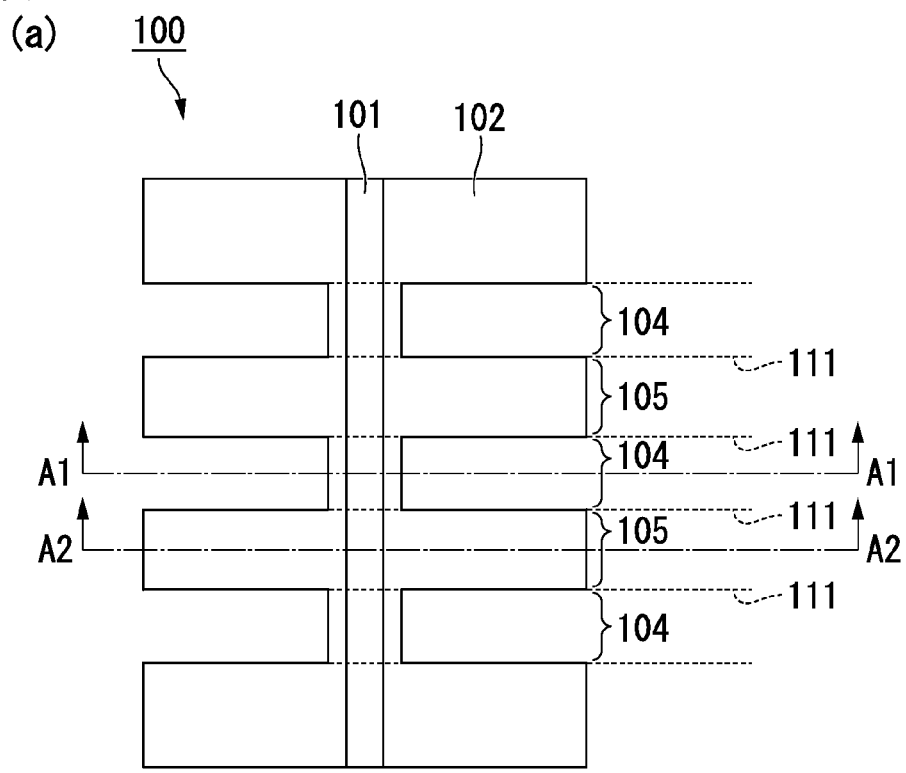
FIG. 12 shows the configuration of the conventional high-order mode filter, wherein (a) shows a plan view, (b) shows a cross-sectional view taken along line A1-A1, (c) a cross-sectional view taken along line A2-A2.
Figure 12:
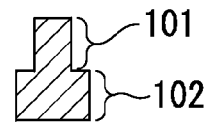
Figure 12:
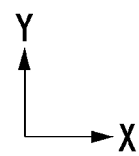
Figure 12:
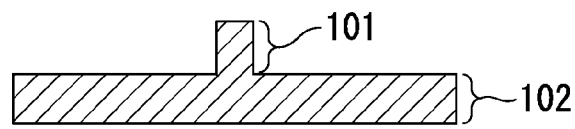
Figure 12:
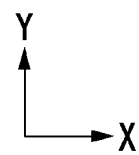

FIG. 11 is a graph showing calculation results with regard to the second-order mode loss (dB/mm) of the high-order mode filter 1000 wherein the horizontal axis represents the length $L_1$ of the first optical waveguide 1004 while the vertical axis represents the length $L_2$ of the second optical waveguide 1005. The performance of removing higher modes in the high-order mode filter 1000 shown in FIG. 11 is similar to the performance of removing higher modes in the high-order mode filter 300 shown in FIG. 3. In FIG. 11, a group of lines 1121 showing high performance of removing higher modes according to Equation 11 and a group of lines 1122 showing low performance of removing higher modes may alternately appear in the $L_1$-$L_2$ plane, thus demonstrating high performance of removing higher modes in the area specified via Equation 13. That is, the second embodiment substantiates the mechanism of removing higher modes which is described in the first embodiment.

Lastly, the present invention is not necessarily limited to the foregoing high-order mode filters according to the first embodiment, the second embodiments, and variations; hence, the present invention may embrace variations and modifications that fall within the scope of the appended claims.

INDUSTRIAL APPLICABILITY

The present invention provides high-order mode filters which can be installed in various optical elements such as laser elements, which can suppress reflected light and stray light, and which can be manufactured with ease. Additionally, the present invention provides high-order mode filters which can be miniaturized, which can achieve high quality optics, and which can be widely applied to optics-related technological fields.

REFERENCE SIGNS LIST

200, 300, 600, 700, 800, 900, 1000 high-order mode filter
201, 301, 501, 601, 701, 801, 901, 1001 projection
202, 302, 502, 602, 702, 802, 902, 1002 slab region
303, 503, 603, 703, 803, 903, 1003 disturbance element
304, 604, 704, 804, 904, 1004 first optical waveguide
305, 605, 705, 805, 905, 1005 second optical waveguide
606, 806, 906, 1006 optical absorption region
706 tapered structure
807 p-type semiconductor area
907 temperature sensor element
808 n-type semiconductor area
809, 908 electrode
1007 silicon substrate
1008 embedded oxidation film
1009 silicon layer
1010 cap layer
311, 611, 711, 811, 911, 1011 connecting face

What is claimed is:
1. A high-order mode filter, comprising:
a planar slab region;
a band-shaped projection which is formed on the slab region in an optical waveguide direction;
a first optical waveguide including a disturbance element, which is formed at a position distanced from the projection in the slab region, with a lower refractive index than the slab region adjoined in a planar direction; and
a second optical waveguide in which the disturbance element not formed close to the projection,
wherein both the first optical waveguide and the second optical waveguide are alternately arranged at least one or more times,
wherein a phase relationship between a removable high-order mode and an intentional high-order mode which is higher than the removable high-order mode and which has a same symmetry as the removable high-order mode is fixed at a connecting face between the first optical waveguide and the second optical waveguide, and
wherein lengths of the first optical waveguide and the second optical waveguide in the optical waveguide direction are defined to cause a large high-order mode loss due to interference between the removable high-order mode and the intentional high-order mode,
wherein, based on a wavelength $\lambda$ of light in a vacuum, an effective refractive index $n_1^{\mathit{eff}1}$ of the removable high-order mode of the first optical waveguide, an effective refractive index $n_1^{\mathit{eff}2}$ of the intentional high-order mode of the first optical waveguide, an effective refractive index $n_2^{\mathit{eff}1}$ of the removable high-order mode of the second optical waveguide, and an effective refractive index $n_2^{\mathit{eff}2}$ of the intentional high-order mode of the second optical waveguide, the lengths $L_i$ (where i=1, 2) of the first optical waveguide and the second optical waveguide in the optical waveguide direction are defined in accordance with

$$L_2^{opt}L_1 + L_1^{opt}L_2 - 2m \cdot L_1^{opt}L_2^{opt} | < L_1^{opt}L_2^{opt}$$

(where m denotes an integer equal to or higher than 1) and $$L_i^{opt} = \frac{\lambda}{2(n_i^{\mathit{eff}1} - n_i^{\mathit{eff}2})}$$

$$L_i \neq \frac{m\lambda}{n_i^{\mathit{eff}1} - n_i^{\mathit{eff}2}}.$$

2. A high-order mode filter, comprising:
a planar slab region;
a band-shaped projection which is formed on the slab region in an optical waveguide direction;
a first optical waveguide including a disturbance element, which is formed at a position proximate to the projection in the slab region, with a lower refractive index than the slab region adjoined in a planar direction; and
a second optical waveguide including a disturbance element formed at a position distanced from the projection in the slab region
wherein both the first optical waveguide and the second optical waveguide are alternately arranged at least one or more times,
wherein a phase relationship between a removable high-order mode and an intentional high-order mode which is higher than the removable high-order mode and which has a same symmetry as the removable high-order mode is fixed at a connecting face between the first optical waveguide and the second optical waveguide, and
wherein lengths of the first optical waveguide and the second optical waveguide in the optical waveguide direction are defined to cause a large high-order mode loss due to interference between the removable high-order mode and the intentional high-order mode,
wherein, based on a wavelength $\lambda$ of light in a vacuum, an effective refractive index $n_1^{\mathit{eff}1}$ of the removable high-order mode of the first optical waveguide, an effective refractive index $n_1^{\mathit{eff}2}$ of the intentional high-order mode of the first optical waveguide, an effective refractive index $n_2^{\it{eff1}}$ of the removable high-order mode of the second optical waveguide, and an effective refractive index $n_2^{\it{eff2}}$ of the intentional high-order mode of the second optical waveguide, the lengths $L_i$ (where i=1, 2) of the first optical waveguide and the second optical waveguide in the optical waveguide direction are defined in accordance with $$|L_2^{opt}L_1 + L_1^{opt}L_2 - 2m \cdot L_1^{opt}L_2^{opt}| < L_1^{opt}L_2^{opt}$$

(where m denotes an integer equal to or higher than 1) and $$L_i^{opt} = \frac{\lambda}{2(n_i^{\it{eff1}} - n_i^{\it{eff2}})}$$

$$L_i \neq \frac{m\lambda}{n_i^{\it{eff1}} - n_i^{\it{eff2}}}.$$

3. The high-order mode filter according to claim 1 or 2, wherein the disturbance element is formed by doping impurities into the slab region.

4. The high-order mode filter according to claim 1 or 2, wherein, based on a refractive index $n_{core}$ of an optical waveguide core, included in the first optical waveguide and the second optical waveguide, and a mode width W of the removable high-order mode, the lengths $L_i$ (where i=1, 2) of the first optical waveguide and the second optical waveguide in the optical waveguide direction are defined in accordance with $$L_i^{opt} > \frac{n_{core}W^2}{3\lambda}.$$

5. The high-order mode filter according to claim 1 or 2, further comprising an optical absorption area which is made of an optical absorption material and which is disposed at a farther position than the disturbance element from the projection in the slab region in at least one of the first optical waveguide and the second optical waveguide.

6. The high-order mode filter according to claim 5, wherein at least part of the disturbance element and the optical absorption area is formed using a p-type semiconductor area or an n-type semiconductor area.

7. The high-order mode filter according to claim 1 or 2, wherein a tapered structure whose width is varied in a tapered manner is formed in proximity to at least one of a start end and a terminal end of the projection.

8. The high-order mode filter according to claim 1 or 2, wherein a temperature sensor element is formed in proximity to the disturbance element.

* * * * *